(12) United States Patent
Vij et al.

(10) Patent No.: US 7,095,748 B2
(45) Date of Patent: Aug. 22, 2006

(54) BRIDGING APPARATUS FOR INTERCONNECTING A WIRELESS PAN AND A WIRELESS LAN

(75) Inventors: Vikram Vij, Santa Clara, CA (US); Carl A. Gerrard, Chester (GB); Bin Li, Santa Clara, CA (US); Larry Gardner, Los Altos, CA (US); Sivasankar Chander, Santa Clara, CA (US); Murthy Kunchakarra, Cupertino, CA (US); Tim McCoy, Mountain View, CA (US); Richard Swan, Portola Valley, CA (US)

(73) Assignee: Cadence Design Systems, Inc, San Jose, CA (US)

( * ) Notice: Subject to any disclaimer, the term of this patent is extended or adjusted under 35 U.S.C. 154(b) by 962 days.

(21) Appl. No.: 10/154,036

(22) Filed: May 22, 2002

(65) Prior Publication Data

US 2002/0196771 A1 Dec. 26, 2002

(51) Int. Cl.
*H04L 12/28* (2006.01)
(52) U.S. Cl. ................................ 370/401; 370/328
(58) Field of Classification Search ................ 370/385, 370/331, 349, 401, 402, 486, 389, 395.52
See application file for complete search history.

(56) References Cited

U.S. PATENT DOCUMENTS 5,636,217 A    6/1997  Moelard
5,732,074 A *  3/1998  Spaur et al. ................. 370/313
6,167,285 A   12/2000  Howe
6,542,491 B1 * 4/2003  Tari et al. .................... 370/338
6,587,457 B1 * 7/2003  Mikkonen .................... 370/356
6,683,881 B1 * 1/2004  Mijares et al. ............... 370/401

\* cited by examiner

*Primary Examiner*—Brenda Pham
(74) *Attorney, Agent, or Firm*—John Carpenter; Reed Smith, LLP

(57) ABSTRACT

A Wireless bridge conjoins two previously incompatible technologies within a single device to leverage the strengths of each. The Wireless bridge marries the Personal Area Network (PAN) technology of Bluetooth as described in Bluetooth Specification Version 1.0B with the Wireless Local Area Network (WLAN) technology described in the IEEE802.11a specification to provide a wireless system level solution for peripheral devices to provide Internet service interactions. The invention brings together in a single working device implementations of these technologies so they do not interfere or disrupt the operation of each other and instead provide a seamless transition of a Bluetooth connection to Wireless Local Area Network/Internet connection. From the Wireless Local Area Network perspective the inventive wireless bridge extension allows a Bluetooth-enabled device to roam from one Wireless Access Point (bridge) to the next without losing its back end connection. The invention takes into account the minimum separation and shielding required of these potentially conflicting technologies to inter-operate.

4 Claims, 9 Drawing Sheets

Protocol Stack

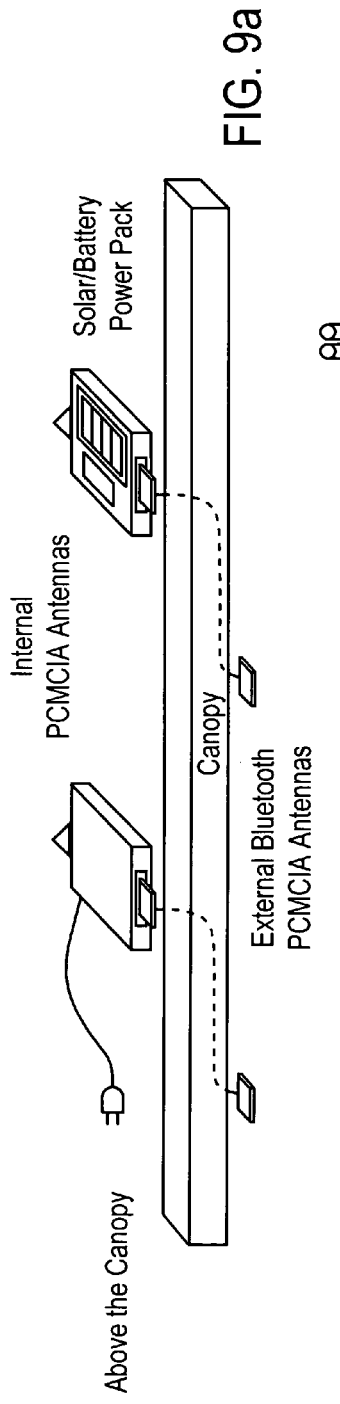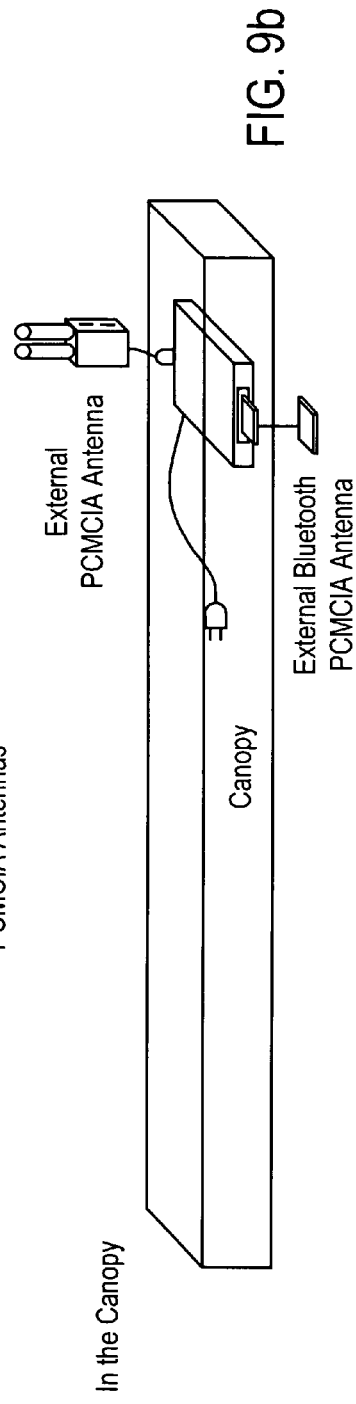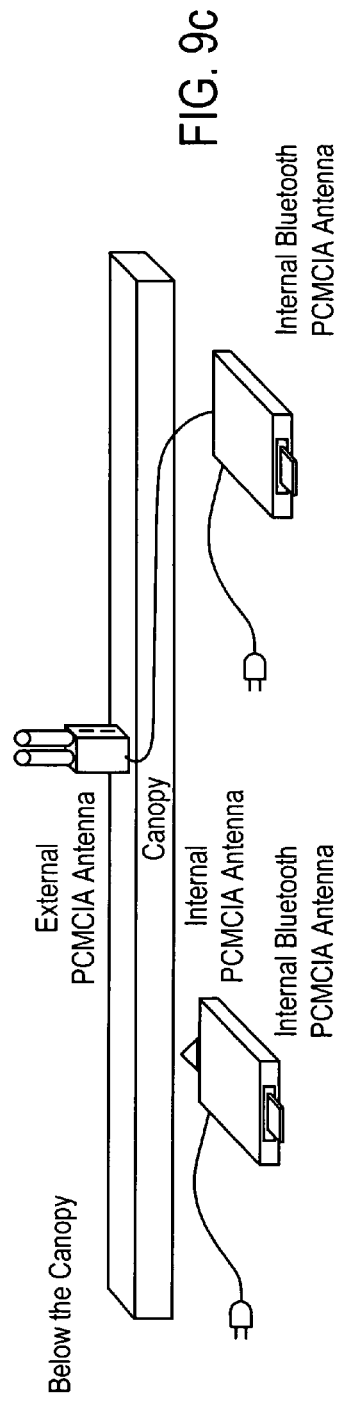

BRIDGING APPARATUS FOR INTERCONNECTING A WIRELESS PAN AND A WIRELESS LAN

BACKGROUND OF THE INVENTION

1. Field of the Invention

The present invention relates generally to the field of communications and more particularly to a communications apparatus which enables seamless, two-way transmission between a plurality of wireless, personal area network (PAN) devices and a wireless local area network (LAN) which may communicate with an Internet-connected server.

2. Description of the Background Art

There are numerous applications where it would be advantageous to provide a plurality of PAN devices that can be wirelessly operated for two-way communication with a remote Internet-connected backend server. By way of example, in many "drive-in" transactions involving a multiple kiosk-type environment, it would be useful to permit a vehicle occupant to communicate wirelessly with the kiosk to facilitate the local transaction. Moreover, if, in turn, the kiosks provided communications with a remote Internet-connected server, a central control system could then monitor, approve and record local transactions in real time without a wire link. A typical automotive service station is a prime illustration of a drive-in kiosk type environment where one could advantageously employ a wireless PAN/LAN two-way communications system using a vehicle-mounted device or hand-held device. The vehicle-mounted device could be a module that operates automatically. The hand-held device could be a personal digital assistant (PDA).

The available art includes various communications systems that provide two-way transmission from transaction kiosks to a remote server. However, such available systems normally require direct interaction with the kiosk or a hard-wired link between kiosks or between the kiosks and a local transceiver. Available solutions for gas stations require that explosion-proof rated cable (e.g. EX zone 1 area 1 rated) be installed between the remote server and the gasoline pumps. Often, the conduits for additional cables may be full or absent. With 24,500 branded gas stations in the U.S. and Canada alone, the envisioned upgrade could be extremely expensive if implemented using available resources.

SUMMARY OF THE INVENTION

The wireless bridge of the present invention provides an end-to-end wireless communication path between a Bluetooth-enabled device (Personal Digital Assistant, Internet-enabled cellular phone, Vehicle Module, etc.) and an Internet-connected server. The wireless bridge is the conjoining of two competitive technologies into a single device to take advantage of the strengths of each. The wireless bridge marries the Personal Area Network technology of Bluetooth with the wireless local area network technology of IEEE802.11a or other wireless LAN standards to provide a wireless system level solution for peripheral devices to Internet service interactions. The challenge met by the present invention therefore, is to find and bring together in a single working device the appropriate implementations of these technologies such that they do not interfere or disrupt the operation of each other, and provide a seamless transition of a Bluetooth connection to wireless local area network/Internet connection.

The design of the preferred wireless bridge is flexible enough to adapt to different wireless technologies. The wireless interfaces are defined as a modular plug-in communication card (e.g., PC Card-based, USB or ISA based) communication cards that are positioned at the opposite ends of the bridge to maximize separation. The drivers for these communication cards are downloaded software modules that can be changed or upgraded with the cards. The software communication drivers interface with standard communication APIs of the selected operating system. The preferred design therefore allows flexible configuration and changes to the wireless bridge as the communication technology and requirements change over time. Bluetooth wireless communication uses the 2.4 GHz frequency range. The IEEE802.1 a standard requires use of the 5.8 GHz frequency range for wireless transmission.

The inventive solution therefore uses the emerging Bluetooth wireless technology to provide a secure, fast connection (1 Mbps) between the vehicle (or any mobile or hand-held device) and a gas pump or other service kiosk, the preferred embodiment being referred to herein as the wireless vehicle link. Because Bluetooth is a Personal Area Network solution, Bluetooth devices must be within 30 feet of each other to communicate. The standard layout of a gas (referred to herein as a station "forecourt") requires that multiple Bluetooth networks be deployed to effectively cover the forecourt. To make the connection between a Bluetooth network and a remote Internet-connected server, a second wireless site link is employed. The wireless site link covers the larger distances to connect the various Bluetooth networks together and provides the backbone bandwidth for the aggregate Bluetooth connections (at least 10 Mbps). Technologies suited to and preferred for the site link requirements is the LAN wireless network or the technology described in the emerging IEEE802.11a wireless LAN standard. To seamlessly integrate the two wireless links together and allow transparent pass-through of data from the vehicle to the Internet-connected backend server, a wireless bridge component is employed.

There are numerous other applications for the advantageous use of the present invention. By way of example, the wireless system of the invention could be used at car wash facilities, fast food establishments, to obtain maps and weather and traffic information and to receive downloaded music. Therefore, it will be understood that the gasoline station example described herein is not necessarily limiting of the various applications of the invention.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which:

FIG. 2, comprising

FIG. 9, comprising FIGS. 9a through 9c illustrates a number of alternative antenna locations for canopy mounting; and.

Figure 1:
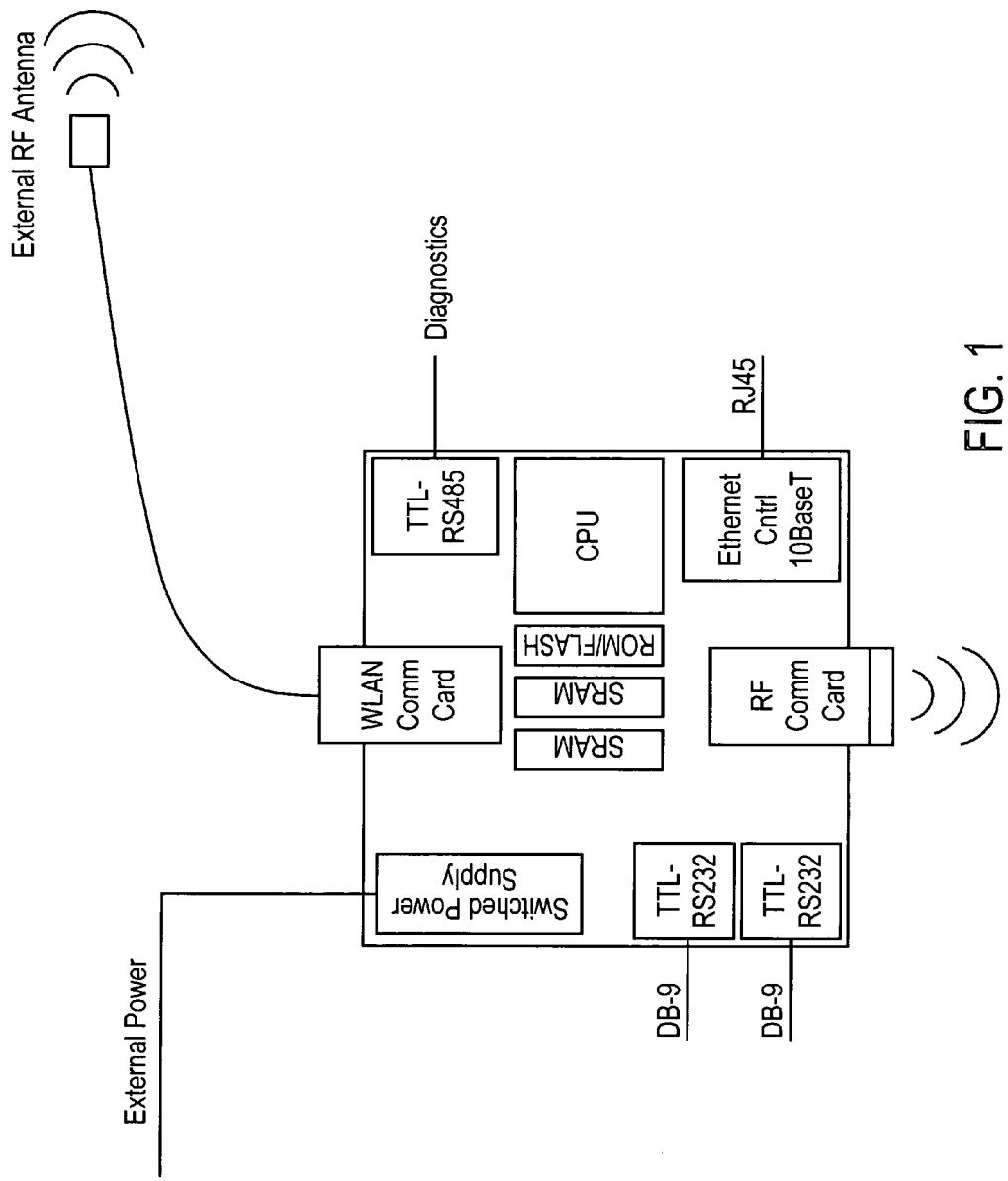
FIG. 1 is a layout drawing of a bridge apparatus of the invention.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION OF PREFERRED EMBODIMENTS

The wireless bridge of the present invention provides an end-to-end wireless communication path between a Bluetooth-enabled device (Personal Digital Assistant, Internet-enabled cellular phone, Vehicle Module, etc.) and an Internet-connected server. In a preferred embodiment using a Bluetooth-enabled wireless Bridge, up to seven (7) Bluetooth-enabled devices can establish and maintain simultaneous connections with an Internet-connected server. Each connection is maintained by a wireless LAN as the user moves between different Bluetooth areas of coverage (ten meter radius) within the wireless LAN area of coverage (nominally 100 meter radius). The Bluetooth-enabled device establishes a new Bluetooth connection in the new Bluetooth coverage area, but the roaming feature of the wireless LAN remembers the Bluetooth ID from the previous connection and reuses it. There is a time limit between the loss of the first Bluetooth connection and the re-establishment of the second Bluetooth connection. As used herein, the term "wireless" means a form of free-space communication employing antennas instead of cables.

Using the Bluetooth-enabled wireless bridge of the present invention, Bluetooth-enabled devices can establish and maintain simultaneous connections with an Internet-connected server. These connections support a variety of data and/or voice packet types. One packet type supports the transmission of voice and data. By combining the communication mechanisms of Bluetooth and the IEEE802.11a standards, the invention realizes an end-to-end reliable, stable wireless connection between a Bluetooth PAN and an Internet-connected server. This communication link operates at up to 436.2 Kbps in both directions or up to 721 Kbps and 57.6 Kbps in the return direction for a single Bluetooth asynchronous data channel. The Bluetooth voice channels all run at 64 Kbps.

The operation of the wireless bridge is based on the interrupt-driven events of communication packet arrivals from the WLAN communication card or the Bluetooth communication card into its arrival queue. Each incoming pass-through packet arrival generates a corresponding transmit interrupt for the opposite communication card/port transmit. Since the WLAN incoming packet stream can be up to 14 times faster than the Bluetooth data stream, total WLAN arrival queues are preferably on the order of 14 times larger than the Bluetooth arrival queues.

The Bluetooth data protocol assumes a single transmit packet and immediate acknowledgment in the next slot at the baseband level. A single packet may be between one and five slots in length, depending on the Bluetooth ACL packet type used. Profile level flow control can be used for flow control on the Bluetooth side of the wireless bridge. One level of flow control on the WLAN side of the bridge is the TCP sliding window flow control for each virtual circuit.

The system hardware for the presently preferred Bluetooth/LAN wireless bridge embodiment is shown in FIG. 1 and includes the following components:

A case that provides required EMI shielding.

A power cable and power supply that accommodate worldwide voltage requirements.

A shielded cable extension to support an external LAN antenna.

A printed Circuit Board (PCB) that contains:

Two modular plug-in communication card slots for the Bluetooth and IEEE802.11a communications cards.

A central Processing Unit (CPU) that supports the software delineated herein.

A dynamic Random Access Memory that supports the execution of the software routing functions and other operating system and support functions and buffers for the data exchanged between the communication cards.

Read Only Memory to support the static code and variables required of the executing programs, boot program, and diagnostics test programs.

Test points and indicator LEDs for board status and diagnostics.

The system software for the Bluetooth/802.11 wireless bridge implementation includes the following software components:

Real Time Operating System (RTOS)

TCP/IP network stack

Embedded WEB server

Embedded Simple Network Management Protocol (SNMP) agent

Bluetooth interface drivers and support software

IEEE802.11 interface drivers and support software

Routing and event management software (to multiplex multiple bluetooth connections)

Error and exception handling software

Diagnostic software

Maintenance software

Software to interface with external modules (e.g., external vehicle modules)

Other os-type software used by wireless bridge buffering flow control

I/O queuing interrupt handling

Figure 2B:
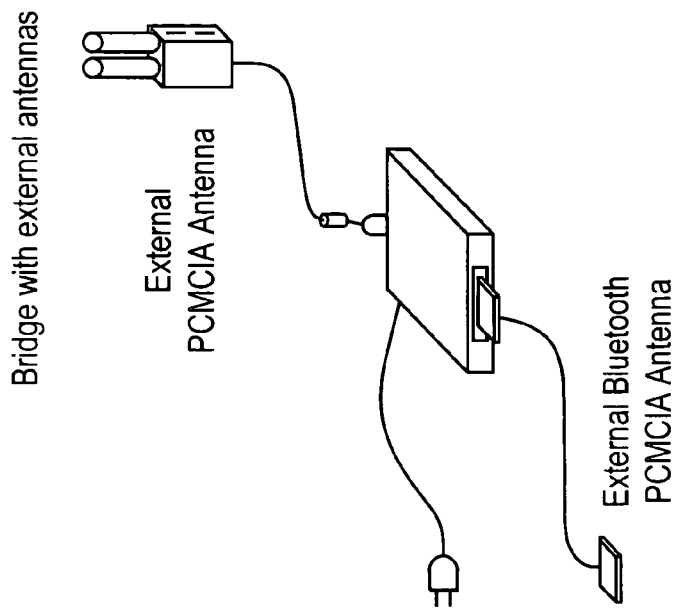
FIGS. 2a through 2c, illustrates a number of bridge apparatus antenna configurations.
Figure 2A:
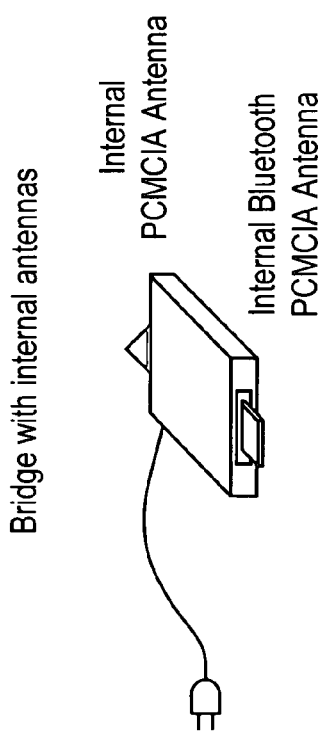
Figure 2C:
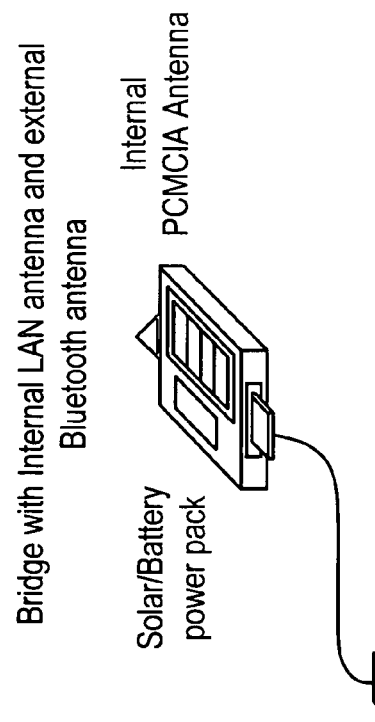

The internal and external antenna configurations for the wireless bridge, which are shown in FIG. 2, adapt the wireless bridge to specific installation requirements. The configuration of two internal antennas is contemplated for a bridge enclosure that provides sufficient shielding and separation between the two antennas. This configuration is used where there is line of sight to both the Bluetooth piconet and the Wireless LAN (IEEE802.11a) access point.

Figure 3:
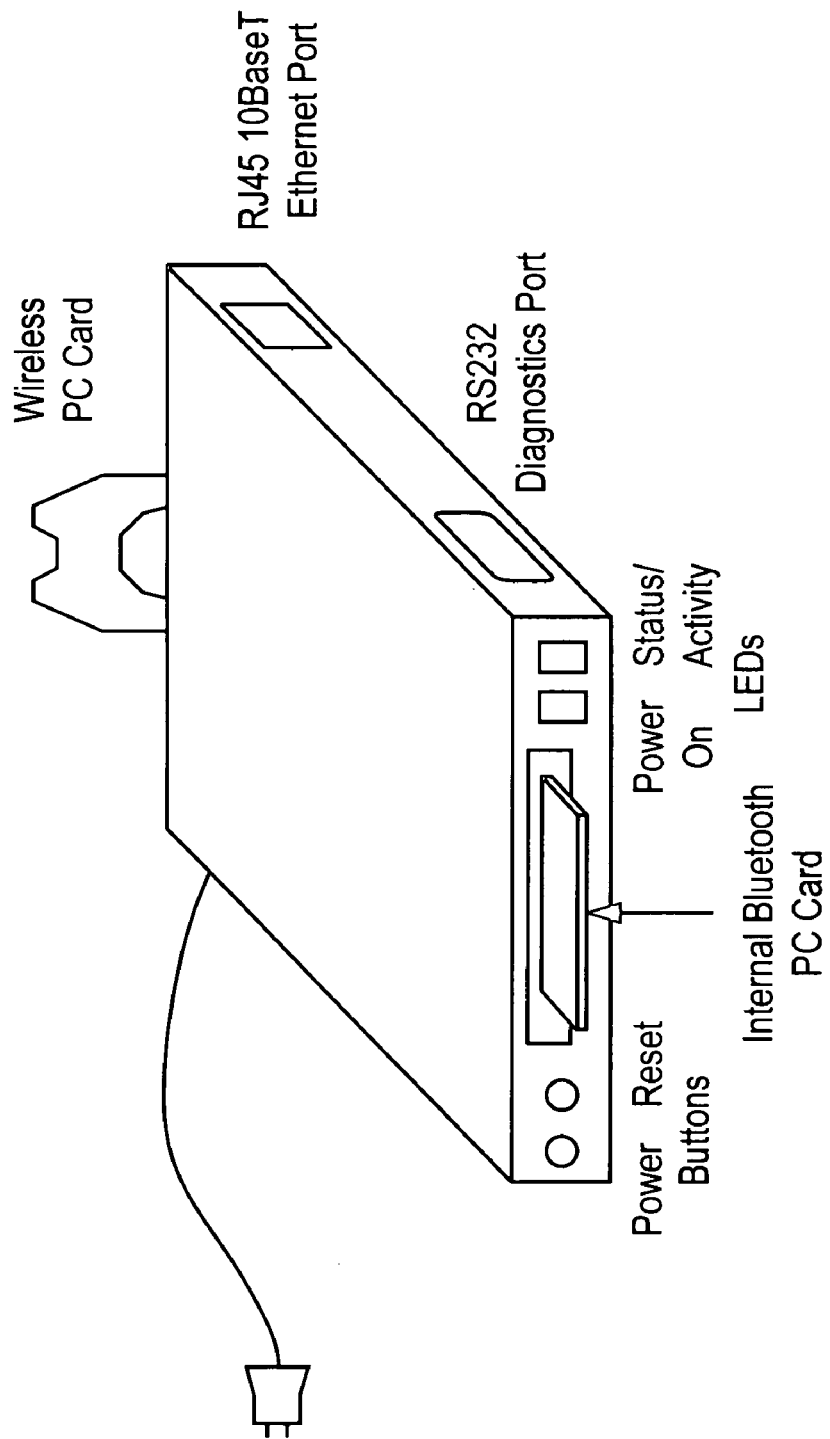
FIG. 3 is a perspective view of a bridge apparatus according to one embodiment of the invention.

As shown in FIG. 3, the enclosure is a two-piece formed metal box with slots at either end for the modular plug-in communication cards. Two external push toggle switches function as power (On/Off) and Reset for the unit. Two small LEDs next to the switches provide power on indication and status/activity indications. All PCB components and connectors are surface mounted. One modular plug-in communication card slot is mounted on the top of the PCB, while the other is mounted on the bottom of the PCB at the opposite edge. A ground plane runs through the middle of the PCB. This ground plane can be omitted if proper isolation of the two modular plug-in communication card slots is achieved. The wireless bridge performs a power-up self test, the results of which are displayed on the LED indicators. Remote tests of the bridge are supported from the Internet-connected server. All diagnostics and self-test are executable via the RS-232 Diagnostic Port and over the site LAN as well. The remote server is able to run diagnostics over the site LAN that could enable control across the WAN attached to the Internet-connected backend server.

Figure 4:
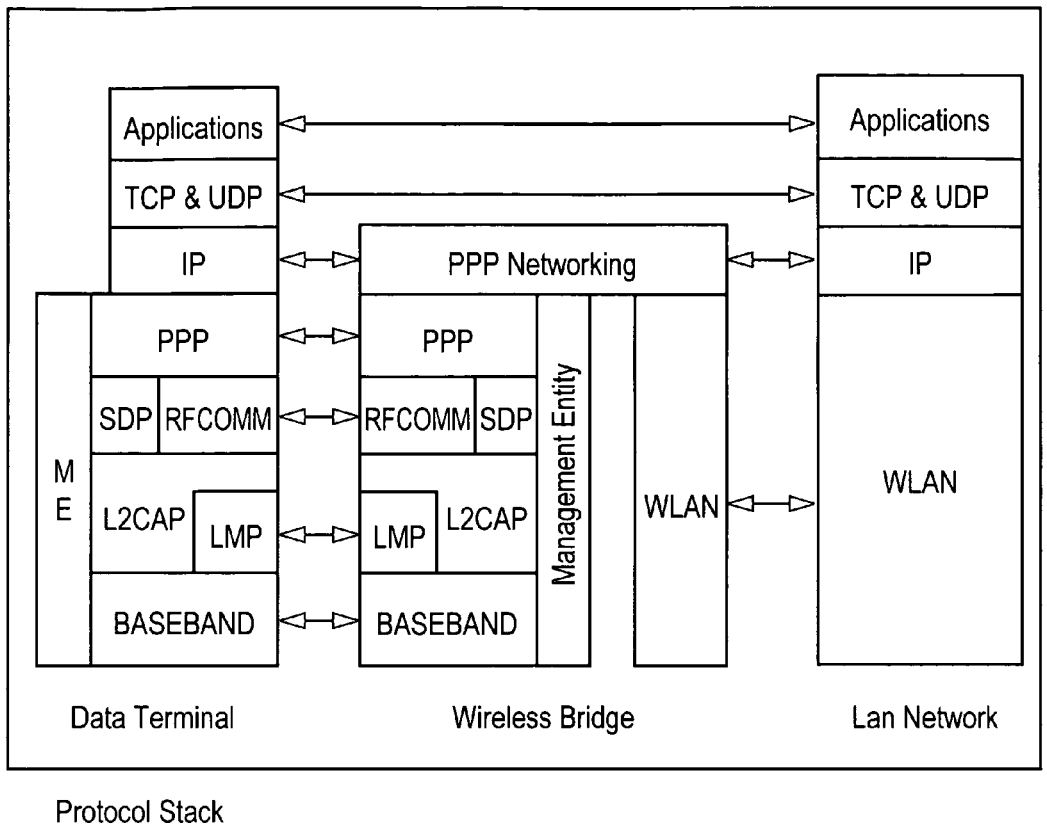
FIG. 4 is a block diagram of protocol flow for an embodiment of the invention using a PDA.

The Bluetooth LAN Access profile is required when a Personal Digital Assistant (PDA) or other device with a full TCP/IP stack is available to communicate through the wireless bridge. As shown in FIG. 4, the LAN Access flow moves information from the hand held browser application down through the full TCP/IP and Bluetooth protocol stack, over the Bluetooth radio link, up through the Bluetooth and peer-to peer Protocol and back down though the wireless LAN stack, over the wireless radio link, and back up through the full wireless and TCP/IP protocol stack to the proxy server. More complete descriptions of Bluetooth parameters are provided in the Bluetooth Specification Version 1.0B which is expressly incorporated herein by reference along with the IEEE 802.11a specification.

Figure 5:
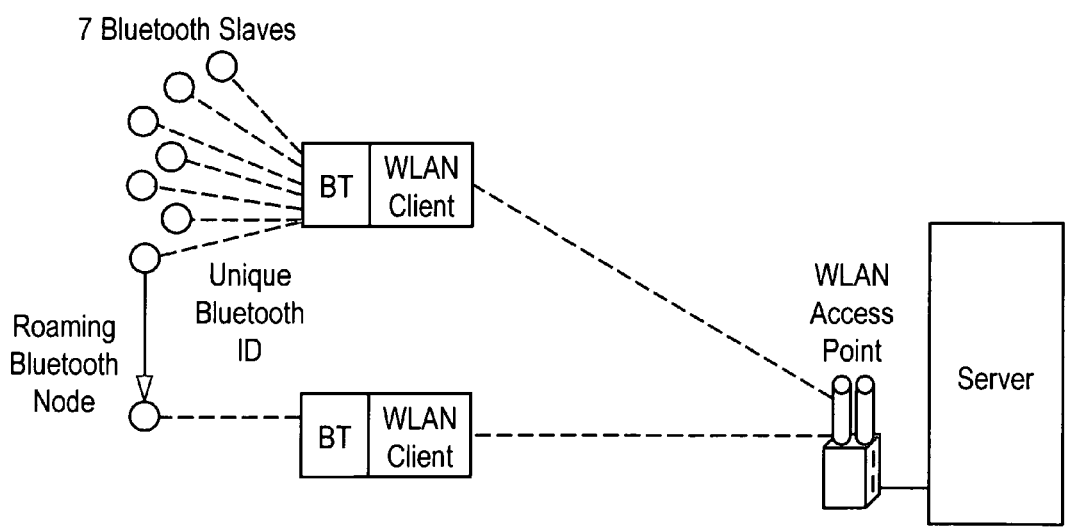
FIG. 5 is an illustration of the roaming feature of the invention.

FIG. 5 illustrates the unique roaming feature of the invention. Two wireless bridges are indicated, however a greater number of bridges is also contemplated. When one of the Bluetooth slaves is moved a sufficient distance from the coverage range of a first wireless bridge, it will fall within the coverage range of a second wireless bridge. Because each Bluetooth PAN device or node has a unique address, the Bluetooth connection between the Bluetooth PAN device and the internet connected backend server can seamlessly migrate from one bridge to another when the Bluetooth device moves, since the backend server remembers this unique address. The second wireless bridge resumes the communications momentarily interrupted when the Bluetooth device leaves the coverage area of the first wireless bridge.

Roaming between Bluetooth piconets may be useful if it enables backend connections between Bluetooth devices and an Internet-connected backend server to remain stable on a move from one piconet to another. If roaming is supported, from the WLAN perspective, the wireless bridge allows a Bluetooth-enabled device to roam from one wireless bridge (WLAN client) to the next without losing the backend connection.

To support roaming, each connection would have to be maintained by the WLAN as the user moves between different Bluetooth areas of coverage (10 m. radius) within the WLAN area of coverage (nominally 100 m. radius). The Bluetooth-enabled device will have to establish a new Bluetooth connection in the new Bluetooth coverage area, but the roaming feature of the wireless LAN will remember the Bluetooth ID from the previous connection and reuse it.

This is different from the roaming currently supported by WLANs, in that the roaming takes place between WLAN clients and not between WLAN Access Points. For example, if the TCP/IP protocol is running, then in a WLAN, roaming implies that the mobile device having an IP address can roam from one WLAN Access Point to another, retain its IP address and its IP connection with the Internet-connected backend server). With the wireless bridge however, the mobile device does not have an IP address. So when the mobile device moves from one wireless bridge to another, the IP address used by its previous connection with the backend server cannot be retained. So the IP connection used for communication between the mobile Bluetooth device and the backend server is different because that connection is specific to each wireless bridge.

Standard LAN roaming technology requires an overlapping area of two cells, which limits the roaming range to the physical coverage area of overlapping cells. With the unique roaming feature of the present invention, a Bluetooth PAN device or node can roam in a range as large as a 802.11 access point coverage area, and even larger with multiple 802.11 access points. As long as the Bluetooth device enters the coverage area of another wireless bridge within a specified period of time after it leaves the coverage area of a previous wireless bridge, the backend control software can enable the roaming seamlessly. With roaming, the packets that were being transmitted to the client in the previous piconet would be buffered and then transmitted to the client in the new piconet. The migration of the backend connection from one bridge to another will need the participation of the backend server as well. The roaming feature of traditional WLANs provides for WLAN clients to move from one access point to another. In the present invention the two distinct technologies, a PAN and a WLAN are employed. The roaming feature of this invention allows mobile PAN clients to move between service areas served by different wireless bridges, i.e., WLAN clients. This is different from roaming employed in traditional WLANs in that the present invention allows roaming of PAN clients between WLAN clients as opposed to WLAN clients roaming between WLAN access points in traditional WLANs. An example of roaming working in a gas-station environment is explained in Table 1.

Application of the Invention to a Vehicle Service Station

Figure 6:
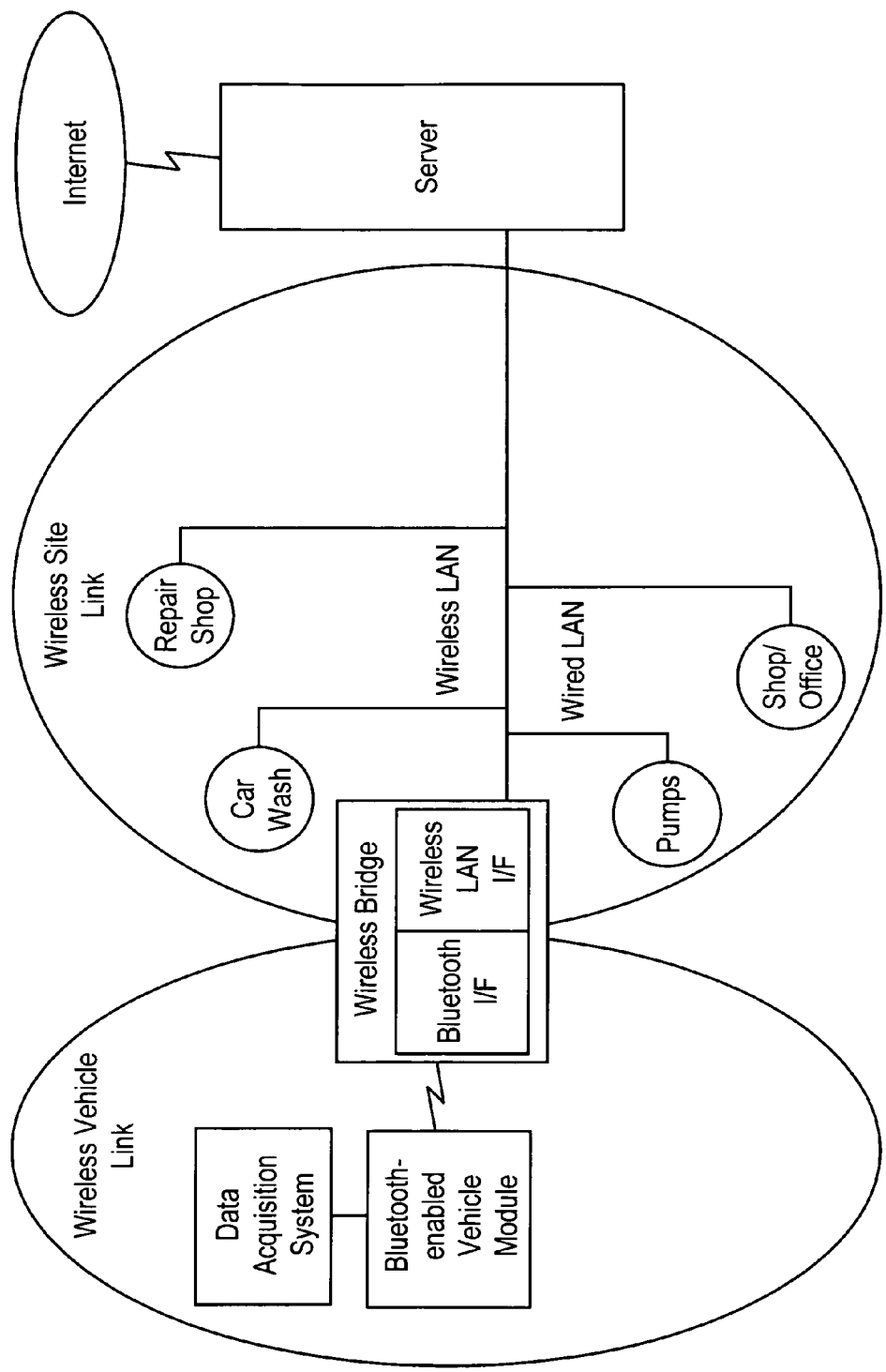
FIG. 6 is a block diagram of an exemplary PAN/LAN system of the present invention shown for use in a service station.

Referring to FIG. 6, it will be seen that in a typical full service vehicle service station, a communication system in accordance with the present invention provides at least one wireless vehicle (or PDA) link and a wireless site link for wireless communication between a Bluetooth-enabled vehicle or PDA module and an Internet-connected server.

Transmission of data between the wireless bridge and the server is via the wireless LAN. A permanent virtual circuit is established via TCP between the wireless bridge and the server to carry all vehicle communications. Certain relevant vehicle data, obtained via the Data Acquisition System (DAS) is downloaded via the Bluetooth link from the vehicle while fueling is underway, without driver intervention. The wireless bridge also uses voice over IP protocol extensions to establish voice links between the Bluetooth enabled vehicle and the Internet-connected backend server.

Each wireless bridge uses one or more RS-232 interfaces. These serial interfaces can be used to support a serial pass-through connection from other equipment to determine the location of a vehicle, in a manner based on a Tag fitted to it (a "Localization Reader"), or used as a local RS-232 Diagnostics Port.

For support of the Localization Tag Reader, the interface provides serial communications through the wireless bridge to Internet-connected backend server application on the Internet-connected backend server. The wireless bridge multiplexes this serial traffic on to a TCP permanent virtual circuit to the Internet-connected backend server via the WLAN.

Figure 7:
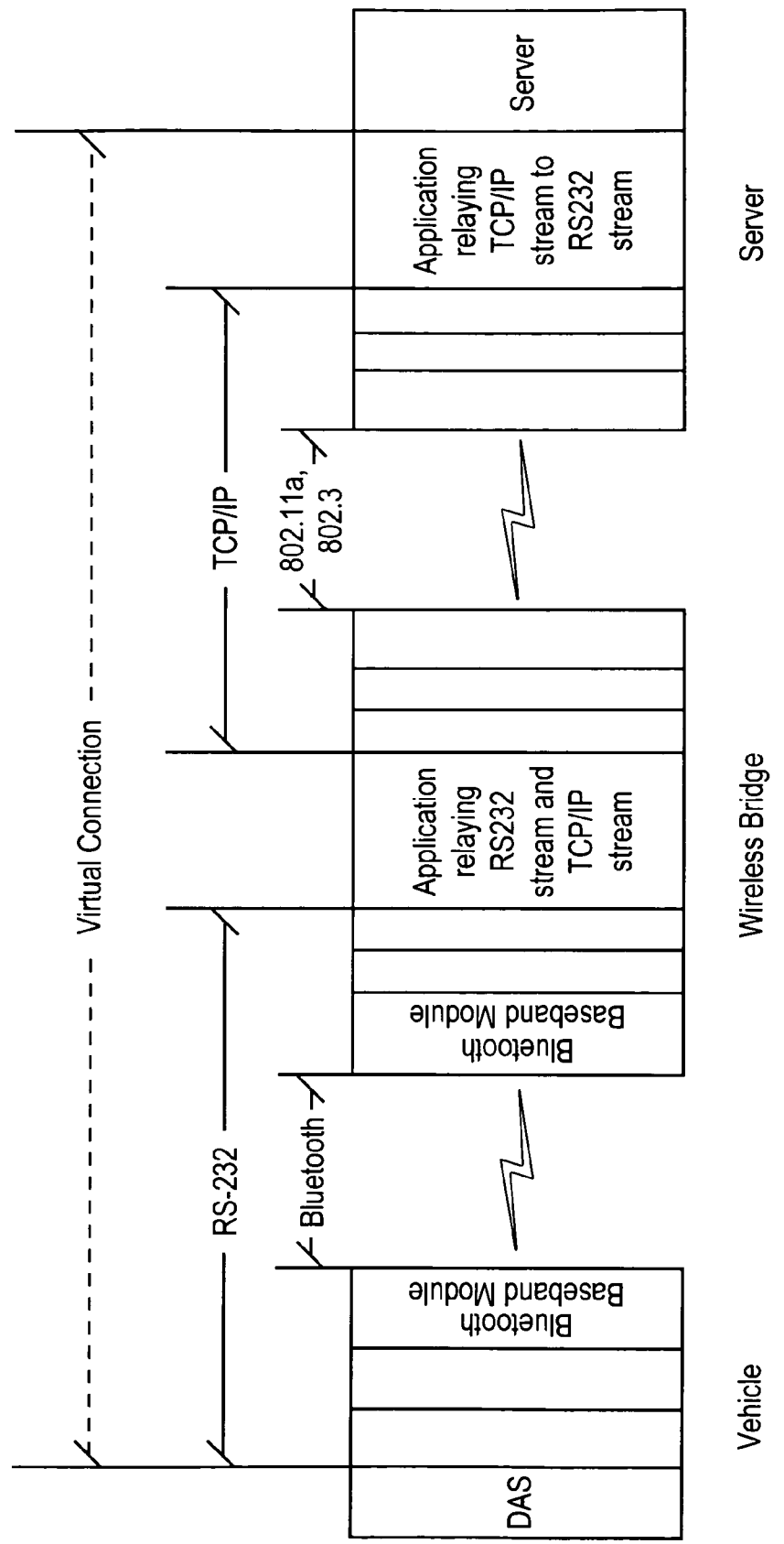
FIG. 7 is a block diagram of the interfaces and modules providing communications between a vehicle module and an Internet-connected backend server used in the gasoline station example of the invention.

With limited system resource, the Data Acquisition System (DAS) will not have all the communication stacks to form a TCP/IP network connection with the Internet-connected backend server. It communicates with the wireless bridge through the Bluetooth wireless connection. The existing vehicle module's wireless module that communicates to the Internet-connected backend server is a RS-232 serial interface. In order to preserve the same message format and data flow, the bridge may include a virtual RS-232 interface between the vehicle module and the Internet-connected backend server. FIG. 7 shows the interfaces and modules in the vehicle module and the Internet-connected backend server communication.

The wireless bridge is responsible for reformatting the incoming data from the vehicle module and sends them to the Internet-connected backend server on a TCP/IP network connection. Application software on the wireless bridge will relay the RS-232 data stream from vehicle module to the and TCP/IP data streams from the Internet-connected backend server. Application software on the Internet-connected backend server will translate the TCP/IP stream to RS-232 data stream.

Figure 8:
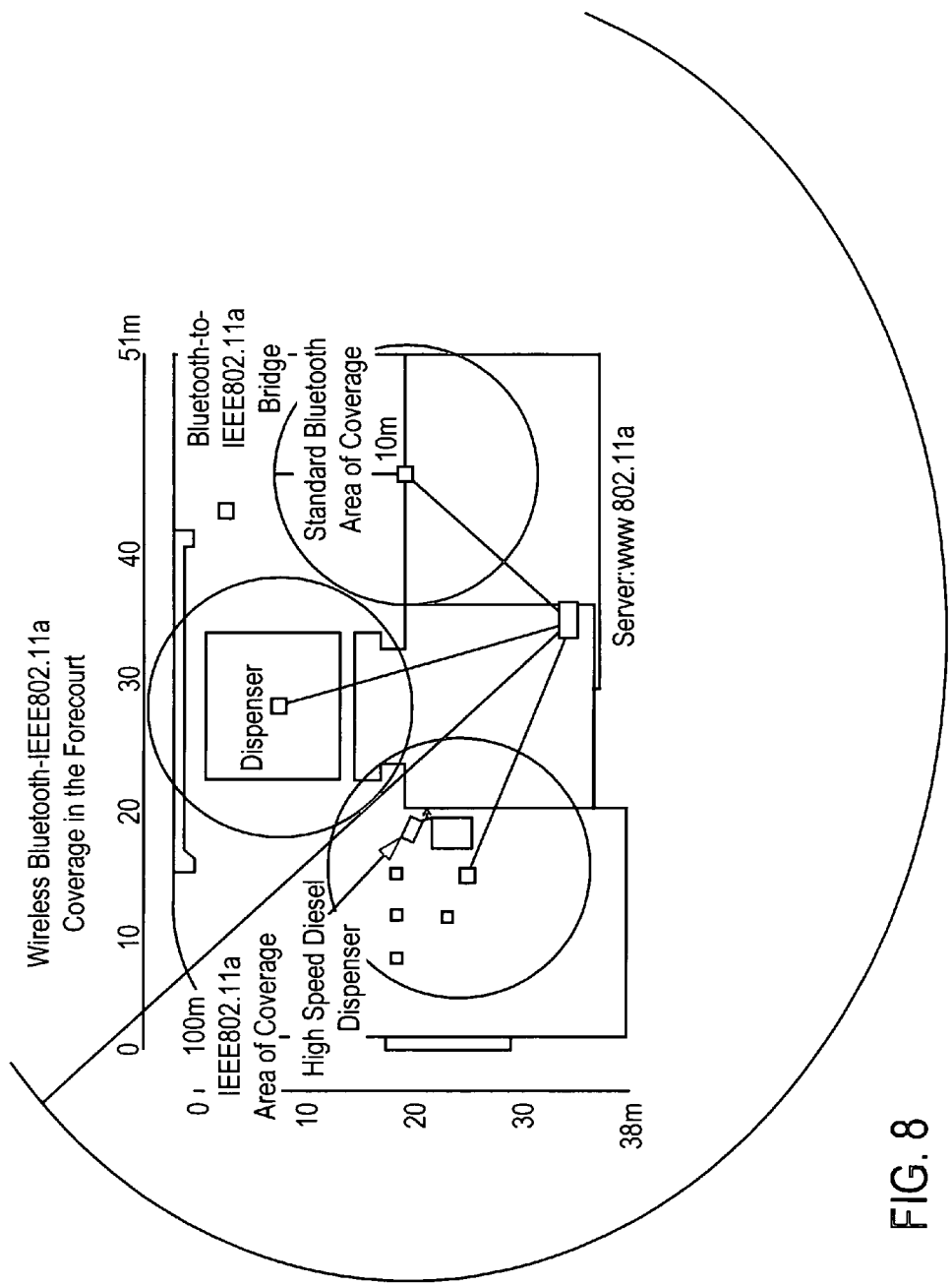
FIG. 8 is a coverage layout drawing for a typical service station configuration.

The wireless bridge may be placed on a column or a pan in front of the forecourt, and/or at the car wash or other locations, so as to give sufficient coverage. Multiple bridges may be required to effectively cover the entire forecourt. FIG. 8 illustrates a typical forecourt layout with both types of area coverage indicated. A "Forecourt" is defined herein as a drive-in area to receive gasoline or goods or other services.

As shown in FIG. 9, the antenna configurations can be used in any combination where the wireless bridge needs to be located below or above the canopy of the forecourt. Metal in the canopy and/or columns may interfere with antenna performance, so antenna configuration, placement and design needs to take this into account.

The wireless bridge handles up to seven Bluetooth LAN Access connections through the Wireless Network to the Internet-connected backend server. This assumes that the Bluetooth-enabled device in a vehicle or hand held device supports a full TCP/IP protocol stack and thus an end-to-end TCP connection can be supported through the bridge.

The wireless bridge is responsible for reformatting the incoming data from the DAS and sending it to the server on a TCP/IP network connection. Application software has to be developed on the wireless bridge to relay the RS-232 data stream from DAS to the TCP/IP data streams from server. Application software also needs to be developed on the server to translate the TCP/IP stream to RS-232 data stream.

Figure 10:
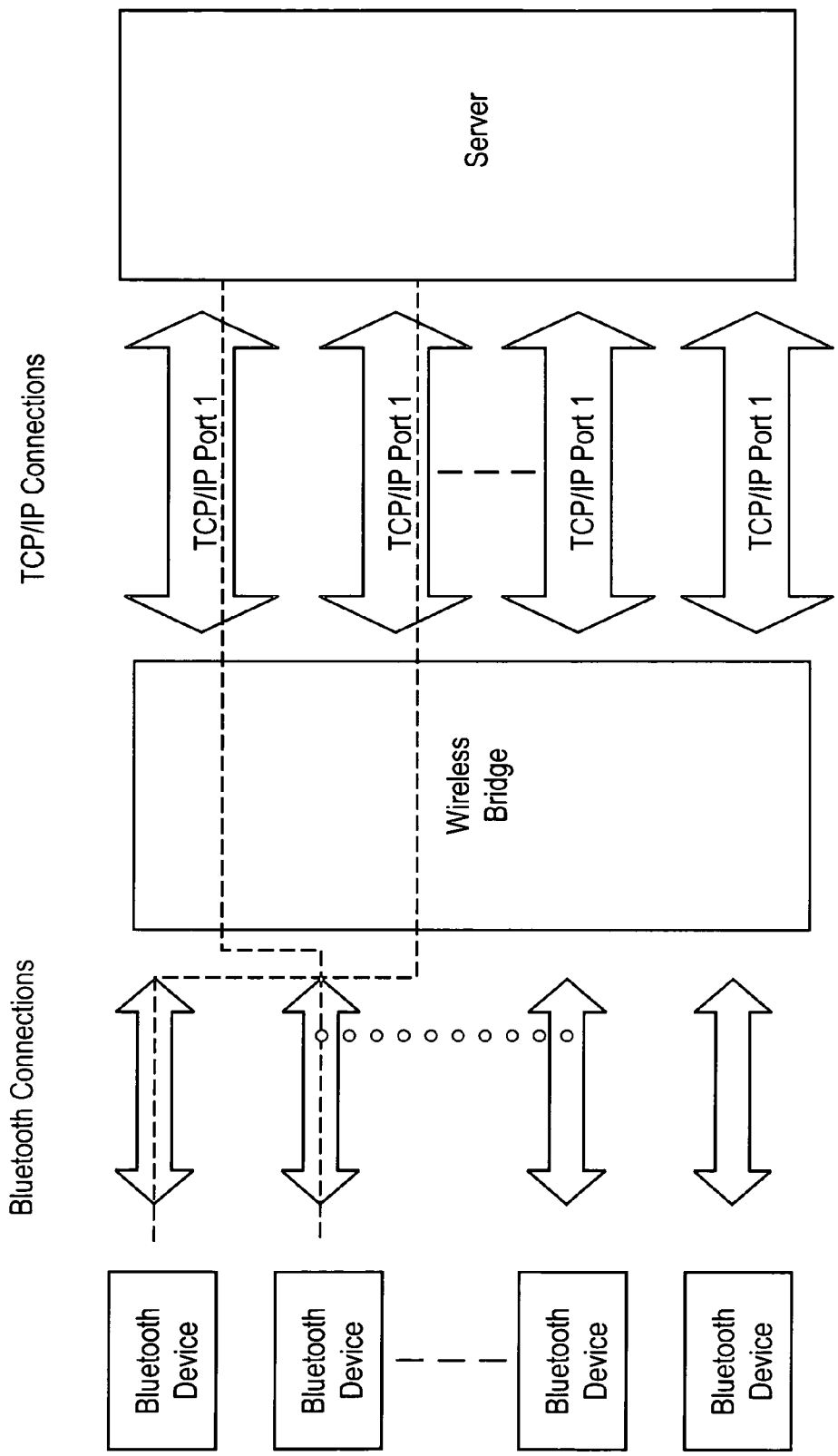
FIG. 10 illustrates the data multiplexing feature of the preferred embodiment.

Up to seven vehicles can be connected to one wireless bridge simultaneously. The wireless bridge is responsible for multiplexing data streams on a TCP/IP connection. One way of implementing the data multiplexing is to open one port for system control and seven ports for data connections at a range of reserved port numbers on the TCP/IP connection between the wireless bridge and the server once the wireless bridge is powered up (see FIG. 10). The server will listen to the system control port and the seven data connection ports for incoming data. When a vehicle connects to the wireless connection through Bluetooth connection, data coming from this vehicle will be relayed to the server through one of the unused ports. When the vehicle leaves and the Bluetooth connection is closed, the port it used will be marked unused again.

The event specification for different events is shown in Table 1. This includes Power On, Vehicle entering Zone, Vehicle in Zone, Vehicle entering, overlapping Zone, Internet-connected backend server closing connection. Internet-connected backend server waking Parked Vehicle, Vehicle leaving Zone, and Vehicle Reentering Zone. This is intended to be an example. The actual design may be different.

The Wireless Bridge always acts as a master. It will try to establish connection with Bluetooth-enabled vehicles or handheld devices. Prior to connection establishment, the bridge will be in Inquiry Mode and the Bluetooth Module in the vehicle or handheld will be in Inquiry Scan Mode. The Inquiry phase will be followed by Paging and Connection phases as defined in the Bluetooth Specification Version 1.0B. The Internet-connected server will try to close inactive Bluetooth connections to minimize the number of Bluetooth connections, since the maximum number of active Bluetooth connections in a piconet is seven. The Bridge will therefore respond to control command from the server. It will establish an exclusive port to the server for this purpose.

Every Bridge has a zone which is defined as the area around it within which Vehicle Modules can set up connections.

On power on, the bridge will do self-tests and initialize the Bluetooth, LAN and serial port interfaces. It will establish a connection with the DHCP server running on the Internet-connected server. It will initialize its Bluetooth piconet node and IP address table, and begin Bluetooth inquiry. The Bridge will set up a control connection with the server, and seven other connections for slaves. All connections between the bridge and the server will be set up using TCP/IP.

When a vehicle enters a zone, the Bridge will receive a response to Inquiry from the Vehicle Module. It will advise the Internet-connected server of the Vehicle Module Bluetooth address and the port number to which this address has been mapped. The bridge will then establish communication with the Vehicle Module and advises the server that the link has been established.

When a vehicle enters an overlapping zone, the bridge in the new zone will not detect the vehicle, since the Vehicle Module stops page scanning when a connection gets established. Thus, only when the signal power degrades such that the old connection gets broken does the Vehicle Module set up a connection with the bridge in the new zone.

Since there can be only seven active connections to a bridge, the system tries to close idle connections. This is triggered by the Internet-connected server. In one option, the server notifies the Vehicle Module which closes the Bluetooth connection at its end. The bridge then detects this closure and updates its port map and advises the server of this closure. As long as there are connections left, the bridge continues Inquiry scanning in the background. In this option, the Vehicle Module does not enter the Page scan mode until its timeout. This timeout can be programmed by the server. In second option, the server notifies the bridge to put the Vehicle Module into the Park mode. The bridge does this, updates its port map, and advises the server of this. The advantage of this option is that the bridge can wake the parked vehicle when notified by the server.

When a vehicle leaves a zone, both the bridge and Vehicle Module detect signal strength loss, and disconnect. The Vehicle Module goes back to the Page scan mode, and the bridge updates its port map and advises the bridge of this event. The server keeps a record of the leaving vehicle's Bluetooth identification and starts a time-out period for the vehicle to re-enter any of the bridge zones. Although the physical Bluetooth connection between the vehicle and the bridge has been terminated, the virtual backend connection between the vehicle and the server is still alive within the time-out period. This enables the vehicle to roam to another bridge zone without losing the connection to the server.

When a vehicle reenters the zone, it establishes a link with the bridge as it did when it entered the zone before. Since the bridge does not keep any state information about vehicles that leave its zone, the connection has to be set up from scratch. However, if the vehicle re-enters any of the bridge zones within the time-out period recorded by the server, the server will find a match of its Bluetooth identification to the records it keeps and re-enable the old connection between the vehicle and the server. Thus, roaming is achieved without losing the backend connection between the vehicle and the server.

TABLE 1

| EVENT | VEHICLE MODULE | BRIDGE | SERVER |
|---|---|---|---|
| Power On | Do startup checks<br>Establish serial link with Bluetooth module<br>Write Bluetooth parameters to Bluetooth module<br>Start Page Scan | Do startup checks<br>Initialize Bluetooth module<br>Initialize LAN module<br>Initialize serial port<br>Establish TCP/IP connection with DHCP server<br>Initialize Bluetooth Piconet node/IP address table<br>Begin Bluetooth Inquiry | Boot Server<br>Start DHCP Server<br>Communicate IP address to Bridge<br>Start Server Applications<br>Initialize Bluetooth device table<br>Listen on Bridge dedicated ports<br>Listen on Vehicle Module dedicated ports (× 7 for each Bridge) |
| Vehicle Enters Zone | Bluetooth module response to inquiry scan<br>Vehicle module connects as Bluetooth slave<br>Vehicle Module stops page scanning | Receives response to Inquiry from Vehicle Module<br>Advises Server of Vehicle Module Bluetooth address on appropriate port number<br>Establishes communication link with Vehicle Module<br>Advises Server of link established with Vehicle Module on appropriate port number | Server maps Bluetooth module to Bridge number and Port number<br>Server maps Bluetooth module as active |
| Vehicle In Zone | Vehicle Module sends configuration data<br>If requested, then start fraud free polling<br>Send vehicle data to Server | | Server reads Vehicle Module configuration data<br>Continuously read vehicle data from Vehicle Module |
| Vehicle Enters Overlapping Zone | (As Vehicle Module is not page scanning, it does not detect the new zone) | | |
| Server Closes Connection (Piconet full) Option 1. | Vehicle Module closes Bluetooth connection<br>Vehicle Module does not reenter page scan mode until timeout | Bridge detects communications closure and updates port map<br>Bridge advises Server of communications closure<br>Bridge resumes inquiry scanning | Server notifies Vehicle Module to close communications, and sleep until timeout<br>Server updates Bluetooth module mapping (setting Vehicle Module to inactive) |
| Server Closes Connection (Piconet full) Option 2. | Vehicle Module parked | Bridge parks Vehicle Module<br>Bridge updates table<br>Bridge advises Server of Vehicle Module Parked<br>Bridge resumes inquiry scanning | Server notifies Bridge to put Vehicle Module into park mode<br>Server updates Bluetooth module mapping (setting Vehicle Module to inactive) |
| Server Wakes Parked Vehicle | Vehicle Module re-enters connected state | Bridge wakes vehicle module<br>Bridge updates table<br>Bridge advises Server of Vehicle Module active | Server notifies Bridge to wake parked vehicle<br>Server updates module mapping |
| Vehicle Leaves Zone | Vehicle Module detects signal strength loss<br>Vehicle Module disconnects<br>Vehicle Module enters page scan mode | Bridge detects signal strength loss<br>Bridge disconnects<br>Bridge updates table<br>Bridge advises Server of Vehicle Module inactive | Server changes Vehicle Module and status to inactive<br>Server temp stops pump if fueling in progress<br>Server waits "Vehicle Reenter" timeout, and then terminates delivery if fueling was in progress<br>Server closes data extraction for vehicle |
| Vehicle Reenters Zone (could be different zone) | Vehicle Module establishes link with Bridge | Bridge establishes link with Vehicle Module | Server checks if vehicle id in fueling or data extraction tables<br>If yes, then resume fueling and/or data extraction |

With the anticipated proliferation of Bluetooth, there is a possibility that a Bluetooth Module that does not reside in a wireless bridge will attempt to create a connection with a vehicle's Bluetooth Module. A Bluetooth feature that solves this problem is mutual authentication that utilizes a unique link key. The link key is a common key that is distributed amongst all Bluetooth devices during the connection phase. During the connection phase, the wireless bridge also sends the baud rate, data format, and other transport protocol negotiation settings to the Bluetooth-enabled vehicle or hand held device. These settings include any (CRC-CCITT or other) error detection settings, synchronization mode, error recovery settings and class of device settings.

The security level of encryption supported between Bluetooth and the wireless bridge of the present invention can range up to 128 bit key sizes. The actual size of the keys used will depend on security restrictions imposed by the individual governments of the countries in which the bridge is deployed.

Thus it is seen that by combining the communication mechanisms of Bluetooth and IEEE802.11a, the invention described herein in a preferred embodiment, realizes an end-to-end reliable, stable wireless connection between a vehicle and an Internet-connected server.

Those having skill in the relevant arts will now, with the benefit of the present disclosure of preferred embodiments, perceive various modifications and additions which may be incorporated into the invention. By way of example, while particular wireless protocols have been described, the invention could be readily configured to conform to other wireless protocols. Moreover, while a preferred embodiment of the wireless bridge apparatus of the invention is configured with a unitary enclosure, alternative embodiments could readily provide separate, interconnected enclosures to further assure isolation between respective wireless modular plug-in communication cards. Accordingly, the scope of the invention herein is limited only by the appended claims and their equivalents.

What is claimed is:

1. A communication system for providing a communications link between a moveable wireless device and a remotely located internet connected backend server, the moveable device having no internet protocol address; the system comprising:

at least two communication multiplexing devices positioned at spaced apart locations and forming separate coverage zones for two-way communication with said moveable device when said moveable device is located in a corresponding zone; each said multiplexing device having a unique internet protocol address and a separate connection to said server; and automatic buffering and switching means for selecting an alternative internet protocol address and separate connection between the server and a corresponding multiplexing device when said moveable device leaves one said coverage zone and enters another said coverage zone.

2. The communication system recited in claim 1 wherein each said separate connection between each said multiplexing device and said server is a wireless connection.

3. The communication system recited in claim 1 wherein said coverage zones are substantially adjacent one another for substantially continuous communications between said moveable device and said server as said moveable device leaves one said coverage zone and immediately enters another said coverage zone.

4. The communication system recited in claim 1 wherein each said multiplexing device comprises a wireless bridge having distinct transceivers for communicating with said moveable device and said server.

* * * * *